US009727770B2

(12) United States Patent
Gozzini et al.

(10) Patent No.: US 9,727,770 B2
(45) Date of Patent: Aug. 8, 2017

(54) CONTROLLABLE SIGNAL PROCESSING IN A BIOMETRIC DEVICE

(71) Applicant: Apple Inc., Cupertino, CA (US)

(72) Inventors: Giovanni Gozzini, Cupertino, CA (US); Craig A. Marciniak, San Jose, CA (US); William M. Vieta, Santa Clara, CA (US); Pavel Mrazek, Prague (CZ); Ondrej Konopka, Prague (CZ)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 13/948,097

(22) Filed: Jul. 22, 2013

(65) Prior Publication Data
US 2015/0023571 A1    Jan. 22, 2015

(51) Int. Cl.
*G06K 9/00*    (2006.01)

(52) U.S. Cl.
CPC ....... *G06K 9/0002* (2013.01); *G06K 9/00067* (2013.01)

(58) Field of Classification Search
CPC .................. G06K 9/0002; G06K 9/00067
See application file for complete search history.

(56) References Cited

U.S. PATENT DOCUMENTS

| | | | |
|---|---|---|---|
| 5,877,715 A | 3/1999 | Gowda | |
| 6,330,345 B1 † | 12/2001 | Russo | |
| 6,518,560 B1 * | 2/2003 | Yeh | G06K 9/0002 250/214 AG |
| 6,556,935 B2 | 4/2003 | Morimura | |
| 6,703,994 B2 | 3/2004 | Edwards | |
| 6,766,040 B1 * | 7/2004 | Catalano et al. | 382/115 |
| 7,072,523 B2 | 7/2006 | Bolle et al. | |
| 7,102,673 B2 | 9/2006 | Kimura | |
| 7,358,514 B2 | 4/2008 | Setlak et al. | |
| 7,813,534 B2 | 10/2010 | Ryhanen et al. | |
| 7,903,159 B2 | 3/2011 | Zarnowski et al. | |
| 7,965,874 B2 | 6/2011 | Abiko et al. | |
| 8,098,906 B2 | 1/2012 | Shuckers et al. | |
| 8,622,302 B2 | 1/2014 | Olmstead | |
| 8,654,571 B2 | 2/2014 | John et al. | |
| 9,195,879 B1 * | 11/2015 | Du | G06K 9/00013 |
| 2002/0146156 A1 † | 10/2002 | Morimura | |

(Continued)

OTHER PUBLICATIONS

Third Party Submission Under 37 C.F.R. 1.290 dated Jul. 20, 2015, U.S. Appl. No. 13/948,097, 16 pages.

(Continued)

*Primary Examiner* — Jonathan S Lee
(74) *Attorney, Agent, or Firm* — Brownstein Hyatt Farber Schreck, LLP

(57) ABSTRACT

A processing channel is operatively connected to a biometric device. The processing channel includes an analog-to-digital converter (ADC) connected to at least one of an amplifier and an offset circuit. Biometric signals representing captured biometric data, such as a fingerprint image, are controllably fitted into an input range of the ADC. The ADC input range can include one or more removed ranges and one or more adjustable allowed input ranges. One or more channel parameters are adjusted until a desired number of biometric signals are included in the one or more removed ranges.

20 Claims, 11 Drawing Sheets

(56) References Cited

U.S. PATENT DOCUMENTS

| | | |
|---|---|---|
| 2009/0274343 A1† | 11/2009 | Clarke |
| 2010/0174914 A1* | 7/2010 | Shafir ............................ 713/186 |
| 2013/0287274 A1 | 10/2013 | Shi et al. |
| 2013/0315451 A1* | 11/2013 | Franza ................. G06K 9/0002 |
| | | 382/124 |
| 2015/0022670 A1 | 1/2015 | Gozzini et al. |
| 2015/0071502 A1 | 3/2015 | Breznicky |
| 2015/0199552 A1* | 7/2015 | Du .......................... G06F 21/32 |
| | | 382/124 |

OTHER PUBLICATIONS

U.S. Appl. No. 13/947,572, filed Jul. 22, 2013, Gozzini et al.
U.S. Appl. No. 14/020,886, filed Sep. 8, 2013, Breznicky.

\* cited by examiner
† cited by third party

CONTROLLABLE SIGNAL PROCESSING IN A BIOMETRIC DEVICE

TECHNICAL FIELD

The present invention relates generally to electronic devices, and more particularly to biometric devices in or connected to electronic devices. Still more particularly, the present invention relates to controllable signal processing in a biometric device.

BACKGROUND

Biometric devices are increasingly common in computer or network security applications, financial applications, surveillance applications, and system access control applications. Biometric devices detect or image a unique physical or behavioral trait of a person, providing biometric data that can reliably identify the person. For example, a fingerprint includes a unique pattern of ridges and valleys that can be imaged by a fingerprint sensor. The image of the fingerprint, or the unique characteristics of the fingerprint, is compared to previously captured reference data, such as a reference fingerprint image. The identity of the person is obtained or verified when the newly captured fingerprint image matches the reference fingerprint image.

Devices that image fingerprints or other biometric data can be subject to noise and other errors. For example, noise can occur when a user holds an electronic device that includes a fingerprint sensor, or when the electronic device is connected to a charger that is plugged into a power source, such as a wall outlet. Noise from the charger and other sources can be introduced into the signals produced by the fingerprint sensor. Charger and other conducted-type noises can adversely affect a fingerprint sensor, particularly in that the noise can cause the capacitance measured by the sensor to be measured incorrectly. For example, the noise can result in a higher capacitance measurement, which produces an erroneous image of a fingerprint. Additionally, the noise can cause a loss of dynamic range of the fingerprint sensor.

SUMMARY

In one aspect, a processing channel is operatively connected to a biometric device. The processing channel includes an analog-to-digital converter (ADC) connected to at least one of an amplifier and an offset circuit. Biometric signals representing captured biometric data, such as a fingerprint image, are controllably fitted into an input range of the ADC. The ADC input range can include one or more removed ranges and one or more adjustable allowed input ranges. One or more channel parameters are adjusted until a desired number of biometric signals are included in the one or more removed ranges. The one or more channel parameters may be at least one of a gain of an amplifier, at least one offset signal produced by an offset circuit, and/or a reference voltage for an analog-to-digital converter.

In another aspect, an electronic device includes a processing channel operatively connected to a biometric device. The processing channel can include an analog-to-digital converter (ADC) operatively connected to at least one of an amplifier and an offset circuit. A processor is adapted to controllably fit biometric signals representing captured biometric data into an input range of the ADC. The input range of the ADC can include one or more removed ranges and one or more adjustable allowed input ranges. The processor adjusts one or more channel parameters until a desired number of biometric signals is included in the one or more removed ranges. The one or more channel parameters may be at least one of a gain of an amplifier, at least one offset signal produced by an offset circuit, and/or a reference voltage for an analog-to-digital converter.

In another aspect, a method controllably fits biometric signals into an input range of an analog-to-digital converter (ADC) operatively connected to a biometric device. The input range of the ADC can include one or more removed ranges and one or more adjustable allowed input ranges. A number of biometric signals to be included in the one or more adjustable allowed input ranges is determined, and biometric signals representing captured biometric data is received. The number of biometric signals in at least one adjustable allowed input range can be adjusted when the number of biometric signals in at least one removed range is greater than a desired number of biometric signals to be included in the removed range.

In another aspect, a method controllably fits biometric signals into an input range of an analog-to-digital converter (ADC) included a processing channel of a biometric device. The input range of the ADC can include one or more removed ranges and one or more adjustable allowed input ranges. Initial channel parameters for the processing channel are set, where the initial channel parameters include at least one of a gain of an amplifier, an offset signal, and a reference voltage of the ADC. Biometric signals representing captured biometric data are received, and a determination is made as to whether or not a desired number of biometric signals are included in the one or more removed ranges. If the desired number of biometric signals are not included in at least one removed range, a channel parameter is adjusted. For example, a gain of an amplifier or an offset signal produced by an offset circuit can be adjusted. Biometric signals representing captured biometric data are again received, and a determination is made as to whether or not the desired number of biometric signals is included in the one or more removed ranges. A different channel parameter can be adjusted until the desired number of biometric signals is included in the one or more removed ranges.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1:
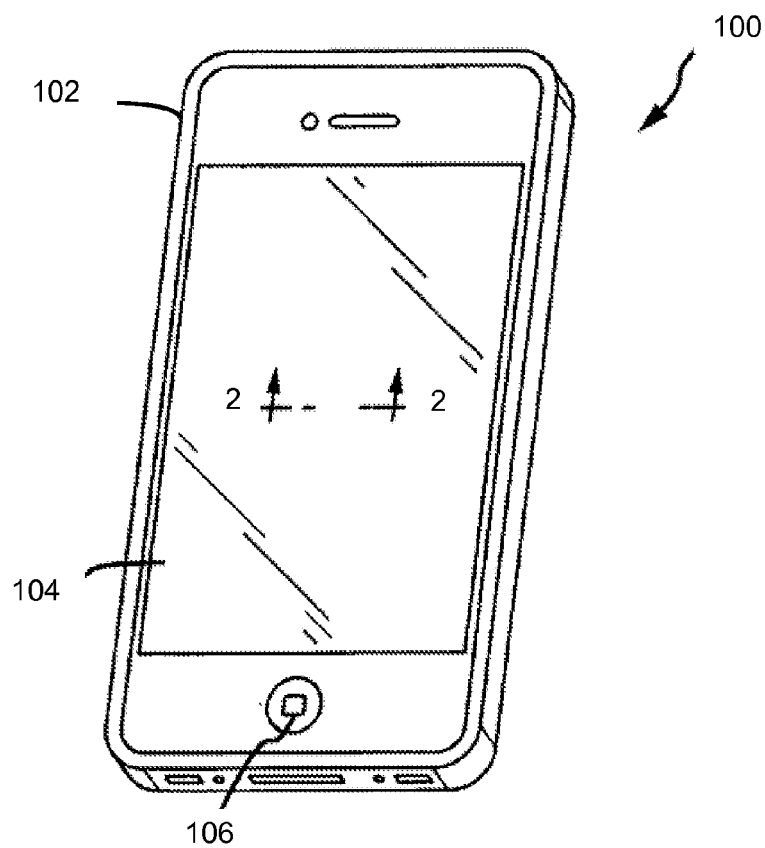
FIG. 1 illustrates a front perspective view of an example electronic device that can include one or more biometric devices.

Generally, embodiments described herein may take the form of a biometric device connected to one or more processing channels. A person's fingerprint, eye, DNA, gait, typing speed or patterns, voice, and heart or brain signals are examples of a physical characteristic or behavioral trait that can be detected or imaged by a biometric device. Capacitance, ultrasonic, optical, resistive, and thermal technologies are examples of technologies that can be employed in a biometric device. Typically, biometric devices produce electrical signals when a person (or portion of a person) is scanned. A processing channel in a biometric device, or connected to a biometric device, receives the electrical signals and processes the signals to produce an image or a unique data structure that defines or represents the captured biometric data. When the electrical signals are analog signals, the processing channel generally includes an analog-to-digital converter (ADC) that converts the analog electrical signals into digital signals. An analog-to-digital converter has a known range of analog input signals that can be digitized by the ADC. Noise and other errors can result in false measurements, which results in incorrect analog electrical signals. Additionally, the noise and other errors can cause the analog electrical signals to be outside of (greater or less than) the ADC input range. This can reduce the dynamic range of the ADC, and result in an indistinct or imprecise image or data structure of the biometric data.

Embodiments described herein controllably fit the electrical signals (hereinafter "biometric signals") into the ADC input range. The ADC input range can include three ranges, namely: a safe input range; one or more adjustable allowed input ranges; and one or more removed ranges. The biometric signals in the safe input range are input into and digitized by the ADC with or without noise. The biometric signals in the adjustable allowed input range or ranges are input into and digitized the ADC without noise, and most, if not all of the biometric signals are digitized by the ADC with noise. The biometric signals in the one or more removed ranges are not input into and digitized by the ADC.

In one embodiment, a fingerprint image is divided into image blocks, and a histogram of the biometric signals is constructed for each image block. Each histogram is a plot of the biometric signals in an image block. One or more channel parameters are adjusted to controllably fit each histogram into the ADC input range. The channel parameters can include the gain of an amplifier, an offset signal produced by an offset circuit, and a reference voltage of the ADC. Adjusting the gain of an amplifier can stretch or contract a histogram, causing the histogram to more optimally fit into the ADC input range. Adjusting an offset signal can shift or move a histogram, also causing the histogram to more optimally fit into the ADC input range. Once established, the determined channel parameters for each image block can be stored in a storage device and used to process the image block in subsequent images. Each adjustable allowed input range of the histogram acts as a guard band that eliminates or reduces the number of biometric signals that are outside the ADC input range or that fall into a removed range. The adjustable allowed input range or ranges permit the fingerprint sensor to be affected by noise while still allowing a satisfactory number of biometric signals to be processed and included in a fingerprint image or data structure.

Embodiments herein are described with reference to a capacitive fingerprint sensor and with a fingerprint image that is logically divided into image blocks. Other embodiments are not limited to this construction. Different types of biometric devices can be used. Additionally or alternatively, other embodiments can detect or image different physical or behavioral characteristics. And the imaged or captured biometric data can be processed differently and not by blocks of data, in which each block represents a non-overlapping portion of the biometric data.

Referring now to FIG. 1, there is shown a front perspective view of one example of an electronic device that can include one or more biometric devices. As shown in FIG. 1, the electronic device 100 can be a smart telephone that includes an enclosure 102 surrounding a display 104, and one or more buttons or input devices 106. The enclosure 102 can form an outer surface or partial outer surface and protective case for the internal components of the electronic device 100, and may at least partially surround the display 104 and the input device 106. The enclosure 102 can be formed of one or more components operably connected together, such as a front piece and a back piece.

The display 104 is configured to display a visual output for the electronic device 100. The display 104 can be implemented with any suitable display, including, but not limited to, a multi-touch touchscreen that can detect position or touch inputs. The display can include any suitable type of display technology, including, but not limited to, liquid crystal display (LCD) technology, organic light-emitting display (OLED) technology, or organic electro luminescence (OEL) technology.

The input device 106 can take the form of a home button, which may be a mechanical button, a soft button (e.g., a button that does not physically move but still accepts inputs), an icon or image on a display, and so on. Further, in some embodiments, the input device 106 can be integrated as part of a cover glass of the electronic device.

In the embodiment illustrated in FIG. 1, a biometric device may be incorporated into the display 104, the input device 106, or both the display 104 and the input device 106. Any suitable biometric device or devices can be used with embodiments and techniques disclosed herein. Suitable biometric devices include capacitive sensors, ultrasonic sensors, optical sensors, pyro-electric sensors, and so on.

Figure 2:
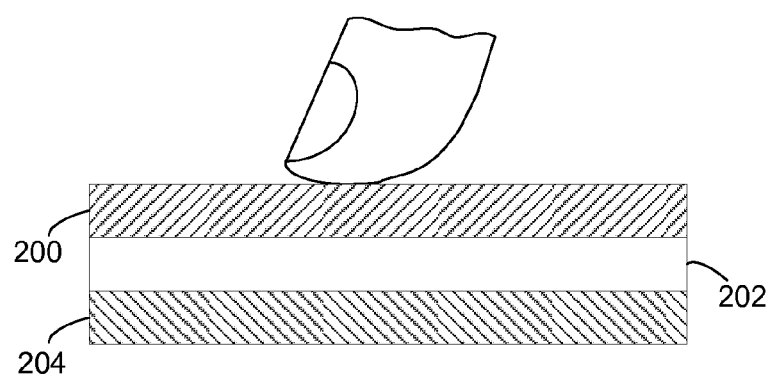
FIG. 2 is a simplified cross-section view of the display 104 taken along line 2-2 in FIG. 1.

FIG. 2 is a simplified cross-section view of the display 104 taken along line 2-2 in FIG. 1. The display stack in the display 104 includes a user input surface 200 disposed over a biometric section 202. For example, the input surface 200 can be a cover glass of a display or a touch surface of a trackpad or button. The biometric section is disposed over a display section 204. In other embodiments, the display section 204 can be disposed over the biometric section 202.

The display section 204 can include one or more layers. For example, the display section can include a polarizer disposed over a display. In another example, the display section can include a front polarizer disposed over a front conductive layer, a color filter layer disposed under the front conductive layer, a color filter layer disposed under the front conductive layer and over a display, a back conductive layer disposed under the display and over a back conductive layer. As described earlier, the display can include any suitable type of display technology.

Figure 3:
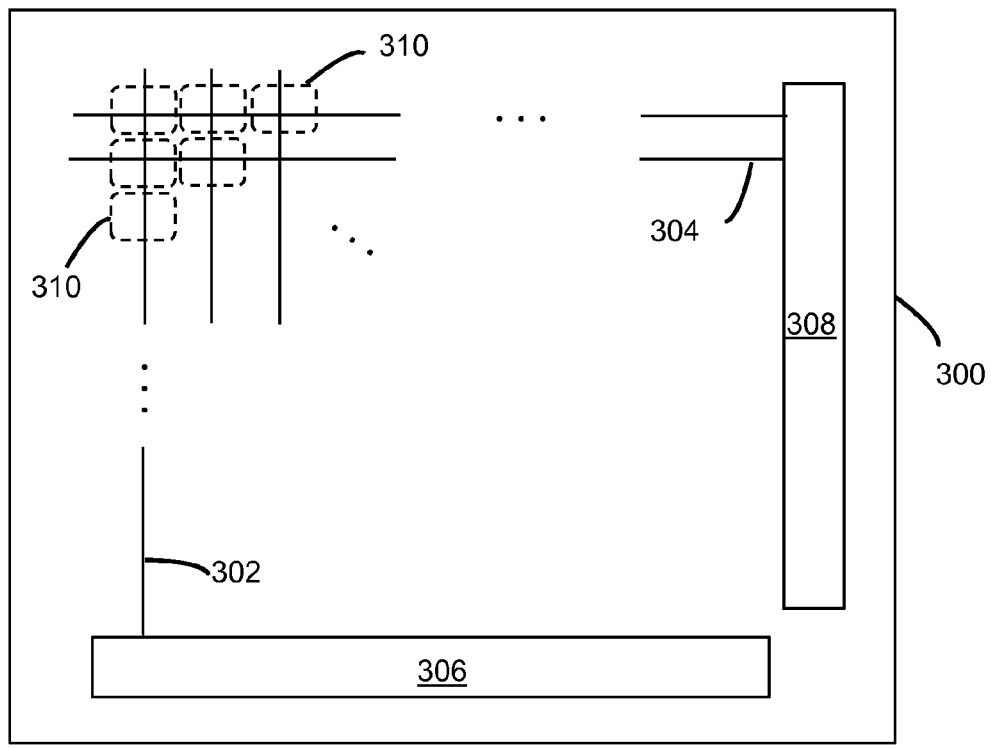
FIG. 3 is a simplified cross-section view of a capacitive fingerprint sensor.

The biometric section 202 can be implemented with any suitable type of biometric technology, including, but not limited to, resistive, capacitance, and ultrasonic. FIG. 3 illustrates a conceptual drawing of a capacitive sensing device in an embodiment. The capacitive sensing device 300 can include a set of drive lines 302 arranged in columns and a set of sense lines 304 arranged in rows. In other embodiments, the sense lines can be arranged in columns and the drive lines in rows. It should be noted that the term "lines" is used herein to mean simply conductive pathways, as one skilled in the art will recognize the pathways are not limited to elements that are strictly linear, but can include pathways that change direction and can include pathways of different sizes, shapes, and materials.

The drive lines 302 can be charged by drive signals output from one or more drive circuits (not shown) and received by one or more drive interfaces 306 in the capacitive sensing device 300. By way of example only, the drive circuit(s) or the drive interface(s) 306 can included a timed circuit that selects each drive line 302 in turn and drives that line for a relatively short period of time, eventually selecting each drive line 302 in a round-robin fashion.

Similarly, sense signals received on the sense lines 304 can be output by one or more sense interfaces 308 in the capacitive sensing device 300 and transmitted to one or more sense circuits (not shown). By way of example only, the sense circuit(s) or the sense interface(s) 308 can included a timed circuit that selects each sense line 304 in turn and senses that row for a relatively short period of time, eventually selecting each sense line 304 in a round-robin fashion.

The drive lines 302 and the sense lines 304 are configured to produce individual capacitive sensors 310 at the intersections of the drive and sense lines. The individual capacitive sensors 310 can be dispersed such that each capacitive sensor 310 can represents a different position on the input surface or on a touch device.

Figure 4:
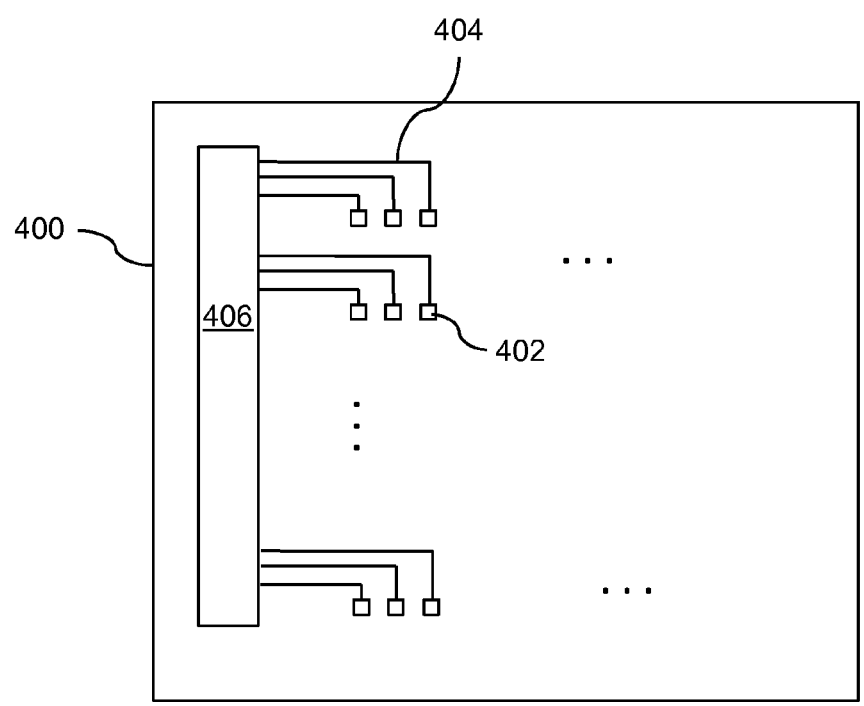
FIG. 4 is a simplified cross-section view of another capacitive fingerprint sensor.

In another embodiment, each capacitive sensor is included in an individual pixel of a display, thereby combining the display and capacitive sensing functions in each pixel. FIG. 4 depicts a conceptual drawing of an array of pixels that include capacitive sensors. In the illustrated embodiment, the individual pixels are included in a display layer 400 and each pixel combines the display and capacitive sensing functions. For simplicity, only the capacitive sensing function is described herein.

A conductive layer is patterned into discrete electrodes 402 with each electrode connected to a sense line 404. Each discrete electrode 402 is included in a pixel. The sense lines 404 can be connected to sense circuits (not shown) through a sense interface 406. The conductive layer with the discrete electrodes 402 can be disposed over a common node layer (not shown). The combination of an individual electrode 402 and the common node layer forms a capacitive sensor. In another embodiment, the electrodes 402 can be disposed under the common node layer. Typically, an insulating layer is disposed between the electrodes 402 and the common node layer.

The capacitive sensors can operate in a self-capacitance mode or a mutual capacitance mode. For example, with a self-capacitance mode in the FIG. 4 embodiment, the common node layer can be connected to a reference voltage or signal, such as ground. The capacitance of a single electrode 402 with respect to ground can be measured. A sense line 404 can be used to measure the capacitance between an electrode 402 and the common node layer (e.g., ground).

In a mutual capacitance mode, the common node layer can be driven with an excitation signal. The sense lines 404 are scanned to measure the capacitance between the electrodes 402 in each pixel and the common node layer.

A fingerprint sensing device captures an image of a fingerprint, or a portion of a fingerprint, when a finger or fingers touch an input surface, such as a cover glass of the display 104. The image of the fingerprint can be captured by measuring capacitive changes at one or more capacitive sensors. In other embodiments, the fingerprint sensing device can be a portion of a touchscreen, a trackpad, one or more buttons such as the home button 106, a key or collection of keys on a keyboard, or another input device. The input surface 200 can be a cover glass of a display or an exterior surface of a trackpad, a button, or a key.

Figure 5:
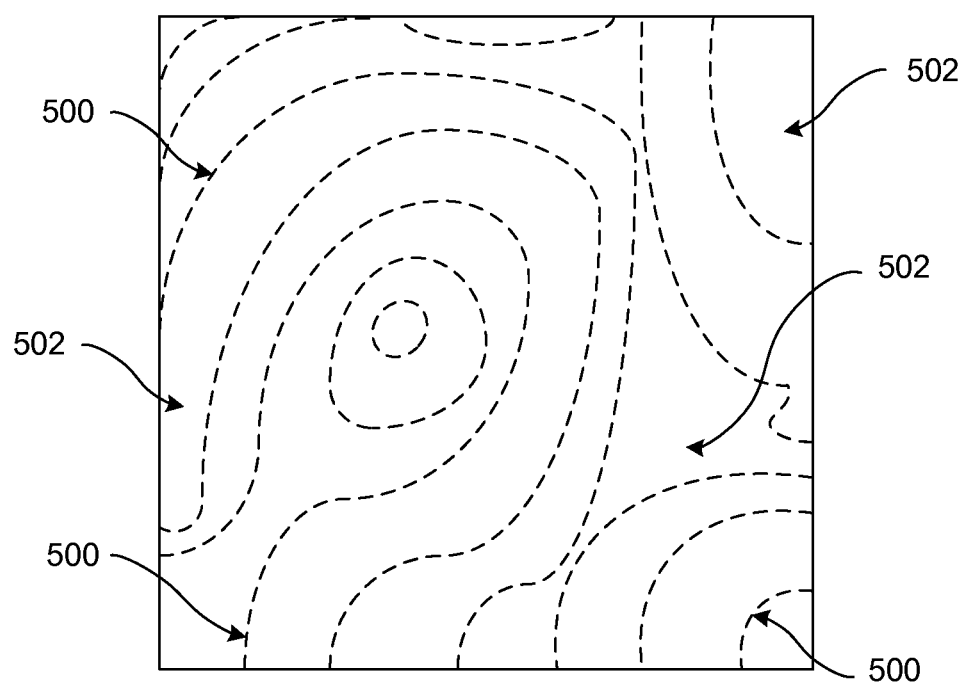
FIG. 5 is a graphic illustration of a portion of a fingerprint image.

A fingerprint includes ridges and valleys arranged in a unique pattern. FIG. 5 is a graphic illustration of a portion of a fingerprint image. The ridges 500 are represented with dashed lines. The valleys 502 are located in the areas between the ridges 500. Typically, the capacitance measured between a ridge 500 varies from the capacitance measured between a valley 502. The measured capacitance between a ridge and an electrode can be greater than the measured capacitance between a valley and an electrode because the ridge is closer to the electrode. The differences in the measured capacitances can be used to distinguish between ridges and valleys.

Figure 6:
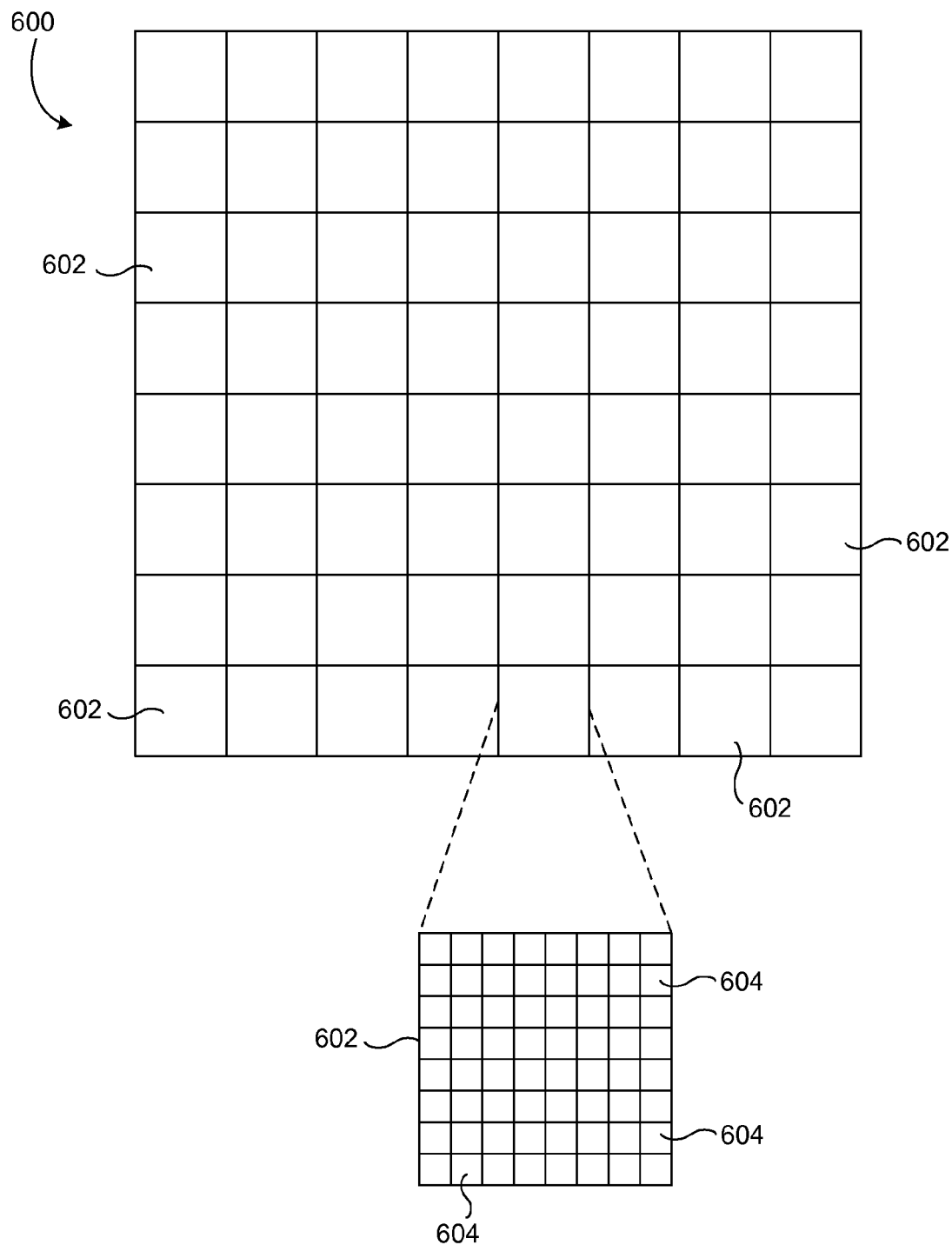
FIG. 6 depicts a conceptual drawing of a fingerprint image logically divided into image blocks.

Referring now to FIG. 6, there is shown a conceptual drawing of a fingerprint image logically divided into image blocks. A fingerprint image 600 can include image blocks 602, each of which represents a section of the fingerprint image 600, and each image block 602 can include multiple sensing elements 604. By way of example only, the fingerprint image 600 can be configured as an eighty-eight by eighty-eight sensing element image, and each image block 602 can include an eight by eight sensing element image block. Thus, in one embodiment, a fingerprint image can include eleven image blocks, with each block representing a non-overlapping portion of the fingerprint image.

Figure 7:
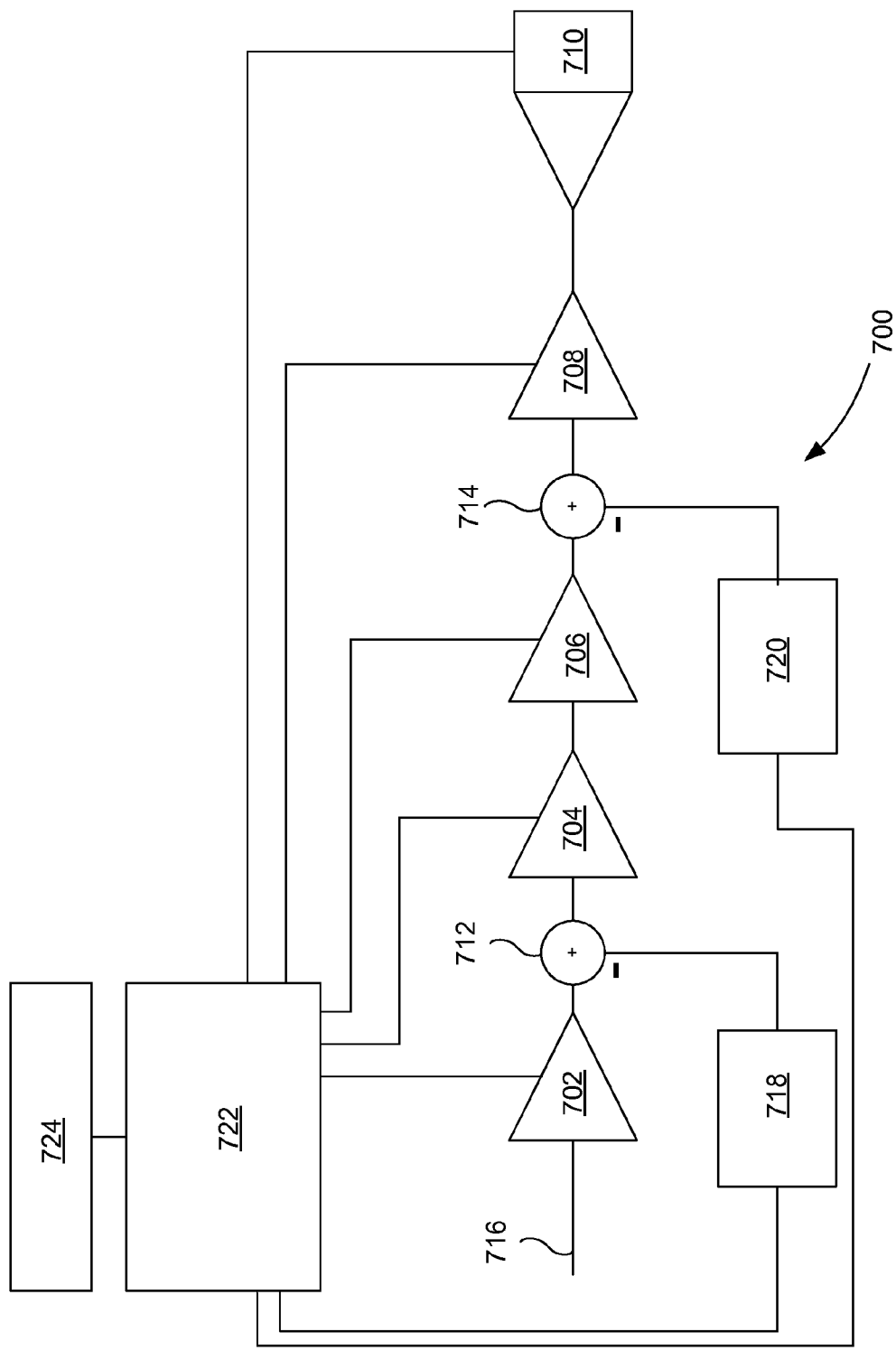
FIG. 7 illustrates one example of a simplified portion of a processing channel suitable for use with a capacitive fingerprint sensor.

In some embodiments, each image block 602 is processed individually when calibrating a fingerprint sensing system and/or when producing a fingerprint image. FIG. 7 illustrates one example of a simplified portion of a processing channel suitable for use with a capacitive fingerprint sensor. The processing channel 700 includes four amplifiers 702, 704, 706, 708 connected in series. An analog-to-digital converter (ADC) 710 is connected to the output of the fourth amplifier 708. A first summing circuit 712 is connected to an output of the first amplifier 702 and an input of the second amplifier 704. A second summing circuit 714 is connected to an output of the third amplifier 706 and an input of the fourth amplifier 708.

In the illustrated embodiment, an analog biometric signal received from each sensing element in an image block 602 is input into the first amplifier 702 on signal line 716. The first summing circuit 712 combines the biometric signal output from the first amplifier 702 with a first offset signal produced by a first offset circuit 718. The analog biometric signal output from the first summing circuit 712 is then input into the second amplifier 704. The biometric signal output from the second amplifier is input into the third amplifier 706. The second summing circuit 714 combines the analog biometric signal output from the third amplifier 706 with a second offset signal produced by a second offset circuit 720. The biometric signal output from the second summing circuit 720 is input into the fourth amplifier 708. The analog biometric signal output from the fourth amplifier 708 is then input into the ADC 710.

Any suitable type of amplifier can be used for each amplifier 702, 704, 706, 708. By way of example only, the first amplifier 702 can be a variable gain differential amplifier, the second amplifier 704 a variable gain AC amplifier, the third amplifier 706 a variable gain correlated double sampling (CDS) amplifier, and the fourth amplifier 708 a programmable gain amplifier. As will be described in more detail later, a gain of one or more of the amplifiers can be adjusted to stretch or contract a histogram of an image block so that the histogram controllably fits into the input range of the ADC 710.

Any suitable type of offset circuit can be used in the processing channel 700. By way of example only, the first and second offset circuits can be integrating digital-to-analog converters. As will be described in more detail later, an offset signal output from one or both offset circuits can be adjusted to shift or move a histogram of the image block to optimally fit the histogram into an input range of the ADC 710.

A processing device 722 can be adapted to adjust the gain of one or more amplifiers in the processing channel 700, to adjust the offset signal produced by one or more offset circuits, and/or to adjust the reference voltage of the ADC 710. The processing device 722 can be implemented with one or more processors, such as, for example, a microprocessor, an application-specific integrated circuit (ASIC), or a field programmable gate array (FPGA), either individually or in various combinations. The processing device 722 can be implemented on the same chip or integrated circuit as the processing channel 700, or the processing device 722 can be separated from the processing channel 700. For example, the processing device 722 can be a processor of the electronic device.

A storage device 724 can be used to store the settings for the gains, offset signals, and/or reference voltage of the ADC that correspond to respective image blocks. The storage device can be used to store one or more image blocks or a fingerprint image that is used to calibrate or test the processing channel. The storage device 724 can be implemented with one or more suitable types of memory, such as, for example, dynamic random access memory, flash memory, and EEPROM, either individually or in various combinations. The storage device 724 can be implemented on the same chip or integrated circuit as the processing channel 700, or the storage device 724 can be separated from the processing channel 700.

Other embodiments can construct a processing channel differently, with fewer, additional, or different components. By way of example only, fewer amplifiers or only one offset circuit can be used.

Figure 8:
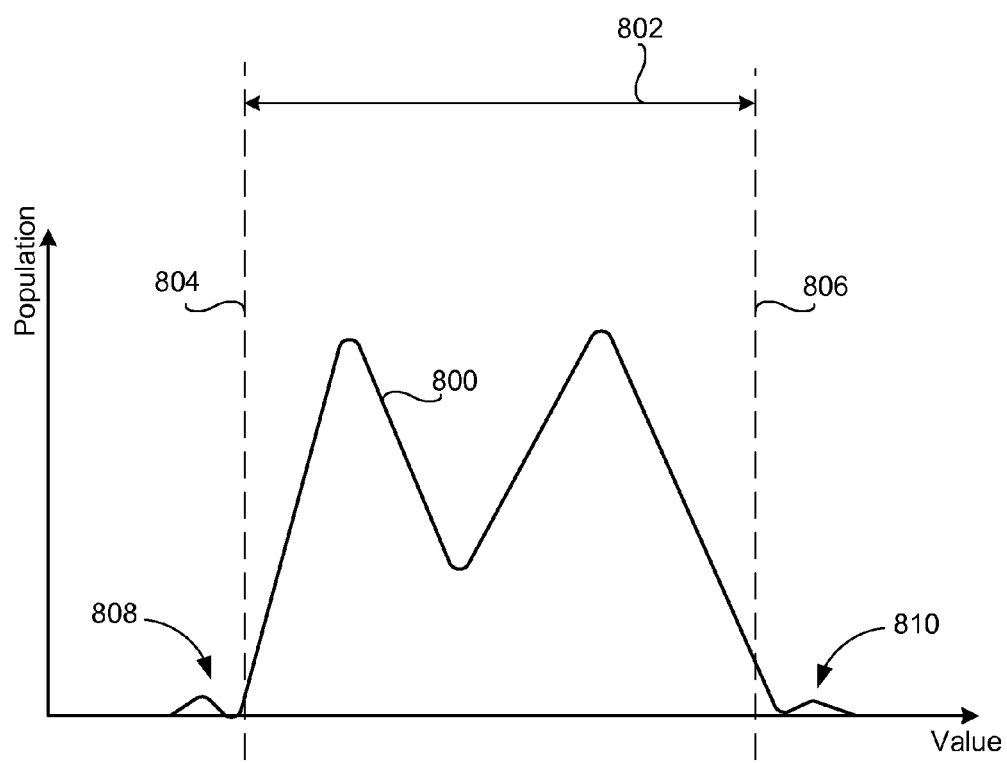
FIG. 8 depicts one example of a prior art histogram for an image block and an ADC input range.

FIG. 8 depicts one example of a prior art histogram for an image block and an ADC input range. The histogram 800 represents a plot of the biometric signals in the image block. The area 802 between the two dashed lines 804, 806 represent a total input range for an ADC (the ADC input range) in the processing channel. As shown in FIG. 8, some biometric signals 808, 810 are outside the ADC input range 802. The number of biometric signals that lie outside of the ADC input range 802 can vary based on several factors, including the amount of noise or other errors in the biometric signals. For example, as discussed earlier, noise can be introduced into the biometric signals when an electronic device is connected to a charger that is plugged into a power source, such as an electrical wall outlet. The added noise in a biometric signal can spread out the histogram, which can result in a higher number of biometric signals being outside the ADC input range (see regions 808, 810). Biometric signal saturation occurs when a biometric signal is outside the ADC range. Biometric signal saturation can adversely impact the resolution and performance of the fingerprint sensing device and produce an imprecise or indistinct image of the fingerprint.

Figure 9:
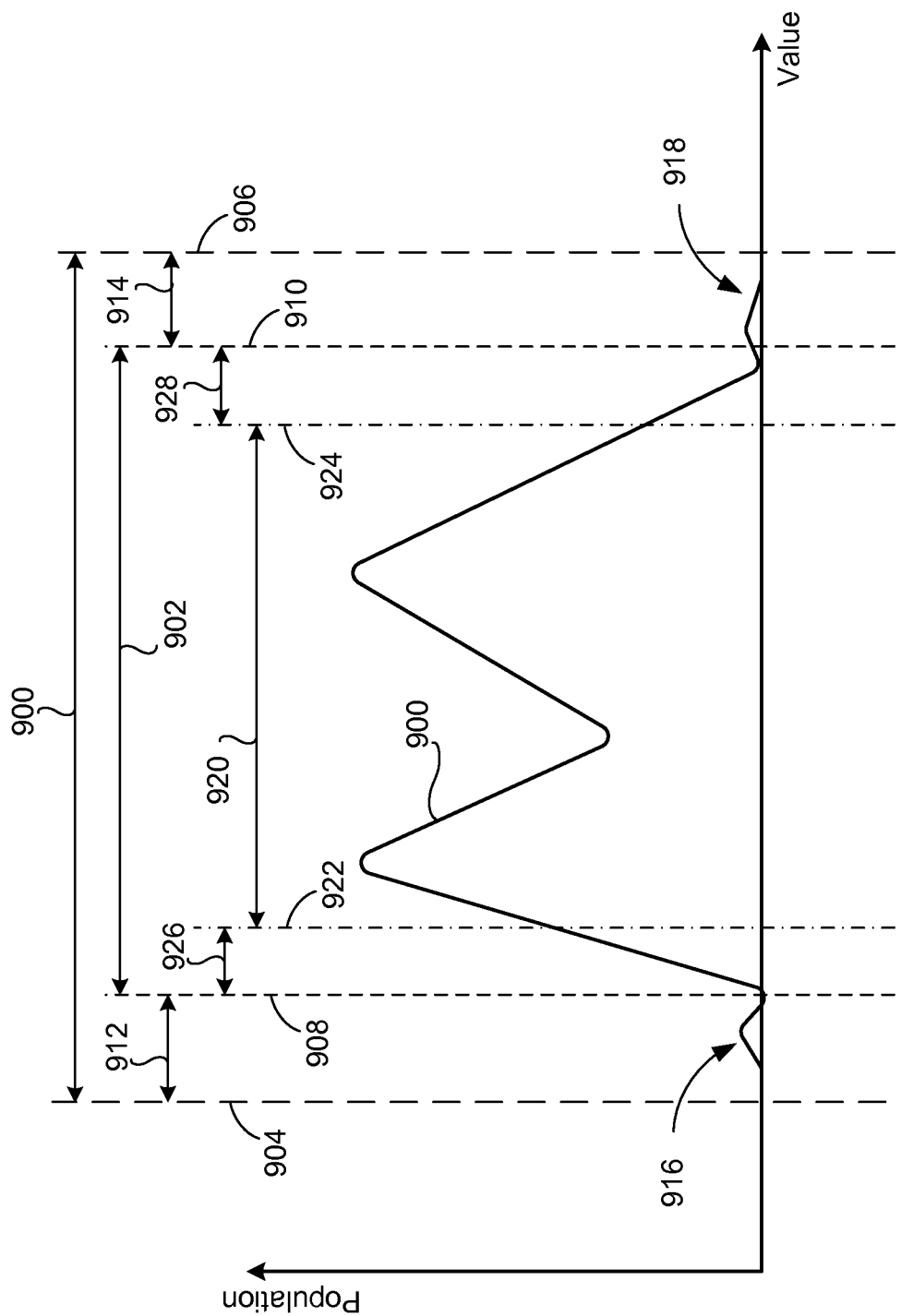
FIG. 9 illustrates an example histogram controllably fitted into an ADC input range.

Referring now to FIG. 9, there is shown an example histogram controllably fitted into an ADC input range. The ADC input range 900 is divided into sections to produce an ADC effective input range 902. The ADC input range 900 is the area between dashed lines 904, 906 and the ADC effective input range 902 is the area between the dashed lines 908, 910.

The removed ranges 912, 914 include biometric signals 916, 918, respectively, that are outside the ADC effective input range 902 but are within the ADC input range 900. In other embodiments, some of the biometric signals in the removed ranges can be within the ADC input range while other biometric signals can be outside the ADC input range. The biometric signals in the removed ranges 912, 914 are not input into and digitized by the ADC in one embodiment. The removed range 912 is the area between the dashed lines 904, 908 and the removed range 914 is the area between the dashed lines 906, 910. The number of biometric signals included in the removed ranges 912, 914 can be equal or non-equal. Additionally, other embodiments can have only one removed range at an end of a histogram.

A safe input range 920 includes a range of biometric signals that will be input into and digitized by the ADC (e.g., ADC 710). The biometric signals included in the safe input range 920 fit into the ADC effective input range 902 with or without noise added to the biometric signals. The safe input range 920 is the area between dashed lines 922, 924.

Adjustable allowed input ranges 926, 928 each include a range of biometric signals that can be input into and digitized by an ADC (e.g., ADC 710). The adjustable allowed input range 926 is the area between dashed lines 908, 922 while the adjustable allowed input range 928 is the area between dashed lines 910, 924. The biometric signals included in the adjustable allowed input ranges 926, 928 fit into the ADC effective input range 902 without noise added to the biometric signals and most, if not all, of the biometric signals in the adjustable allowed input range fit into the ADC effective input range 902 with noise added to the biometric signals. The number of biometric signals in one adjustable allowed input range can be the same as, or differ from, the number of biometric signals in the other adjustable allowed input range. In another embodiment, only one adjustable allowed input range can be used.

The safe input range 920 combined with the adjustable allowed input ranges 926, 928 collectively form the ADC effective input range 902. As will be discussed in more detail below, the number of biometric signals included in one or both adjustable allowed input ranges 926, 928 can be adjusted based on the noise in the biometric signals so that a satisfactory number of biometric signals are digitized by the ADC and included in a fingerprint image.

Figure 10:
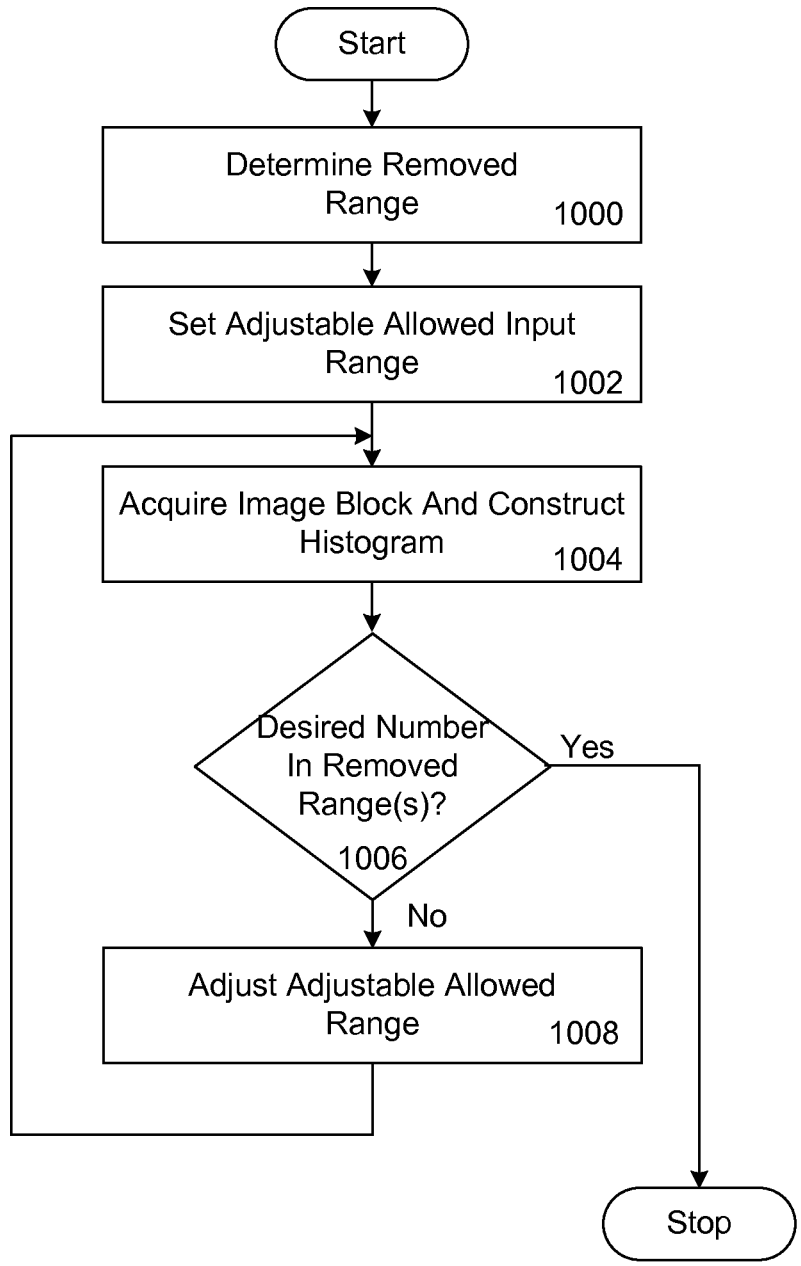
FIG. 10 is a flowchart of an example method for determining ranges for the ADC input range of analog-to-digital converter 710 shown in FIG. 7.

FIG. 10 is a flowchart of an example method for determining ranges for the ADC input range of analog-to-digital converter 710 shown in FIG. 7. The method of FIG. 10 can be performed to calibrate a processing channel, periodically to confirm one or more histograms controllably fit into the input range of the ADC, or at select times. For example, a user can request the method be performed to confirm the processing channel is operating optimally.

Initially, the removed range or ranges for the biometric signals in an image block is determined at block 1000. The number of biometric signals included in a removed range can be less than or equal to a given number. For example, eight or less biometric signals can be included in a removed range. Alternatively, a certain number of biometric signals at the top of the histogram can be included in one removed range and a certain number of biometric signals at the bottom of the histogram can be included in another removed range.

The adjustable allowed input range is determined at block 1002. By way of example only, the adjustable allowed input range or ranges can be set based on the number of biometric signals that fall into a removed range. If the number of biometric signals in each adjustable allowed input range produces a higher number of biometric signals in the removed range or ranges than desired, the number of biometric signals included in each adjustable allowed input range can be modified so that the proper number of biometric signals falls into each removed range.

An image block is then acquired and a histogram constructed at block 1004. In one embodiment, the image block can be stored in a storage device (e.g., storage device 724) and used to calibrate the processing channel. Alternatively, the image block can be acquired in real-time when a fingerprint image is captured.

A determination is made at block 1006 as to whether or not the desired number of biometric signals fall into the removed range or ranges. The method ends if the desired number of biometric signals falls into the removed range(s). If not, at least one adjustable allowed input range is adjusted to either increase or decrease the number of biometric signals in the adjustable allowed input range(s) (block 1008). The process then returns to block 1004 and repeats until the desired number of biometric signals fall into the removed range or ranges.

Other embodiments can determine the effective input range of the ADC by setting the number of biometric signals to be included in the safe range and in the adjustable allowed input range. An image block can then be acquired, a histogram constructed, and a determination made as to whether or not the desired number of biometric signals are in the removed range(s). If the desired number of biometric signals are not in at least one removed range, the number of biometric signals in the adjustable allowed input range can be adjusted and the process repeated until the desired number of biometric signals are in the removed range(s).

Figure 11:
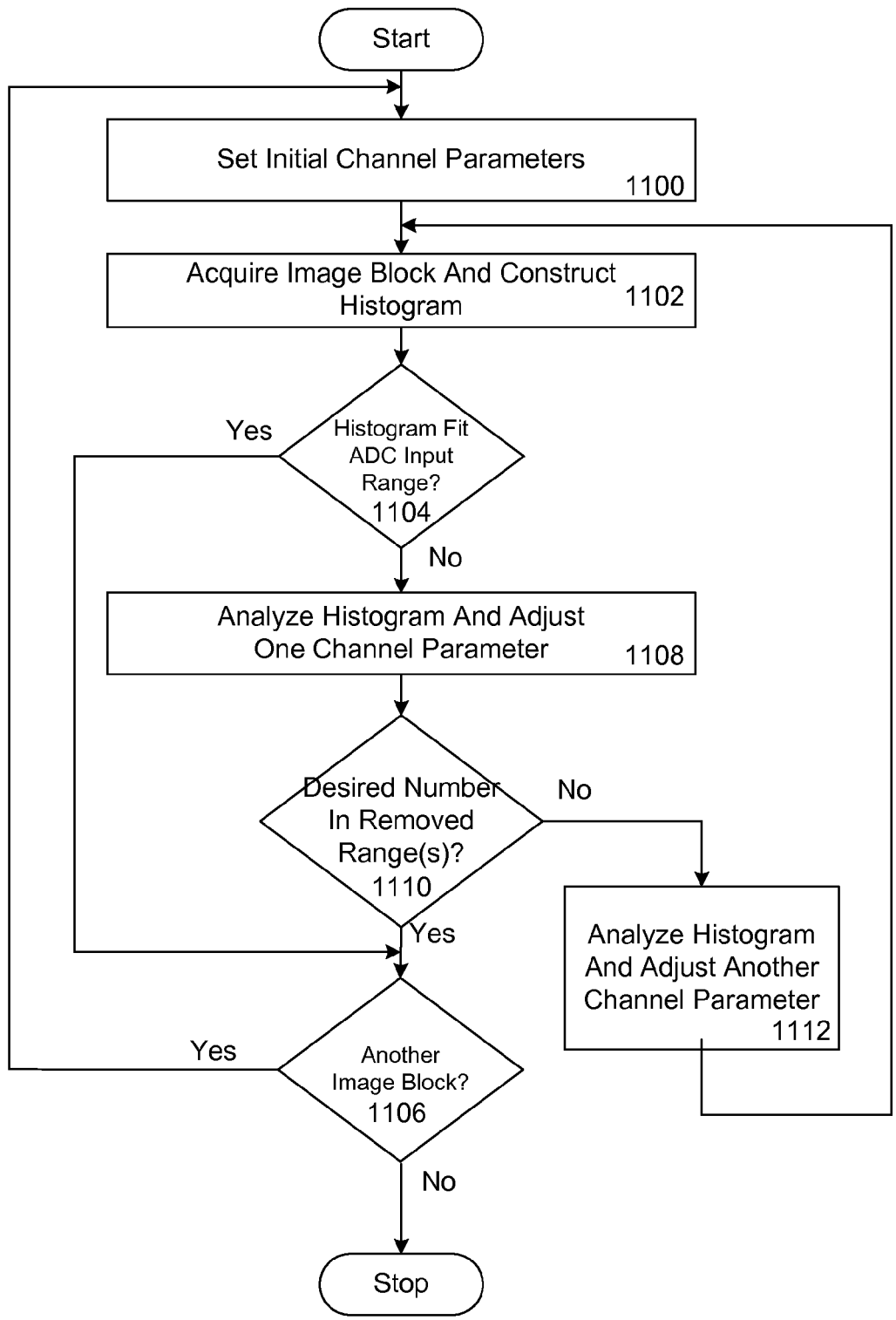
FIG. 11 a flowchart of an example method for controllable signal processing in a processing channel.

Referring now to FIG. 11, there is shown a flowchart of an example method for controllable signal processing in a processing channel. First, the initial channel parameters in the processing channel are set at block 1100. In one embodiment, the channel parameters include the gain of each variable gain amplifier, the offset signal for each offset circuit, and a reference voltage of an ADC. An image block is then acquired and a histogram constructed for the image block (block 1102). As described earlier, a histogram is a plot of the biometric signals in an image block.

A determination is then made at block 1104 as to whether or not the histogram controllably fits into the ADC input range. A controllable fit occurs when the desired number of biometric signals falls within the removed range or ranges, as described in conjunction with FIG. 10. If the histogram controllably fits into the ADC input range, the process passes to block 1106 where a determination is made as to whether or not there is another image block to be processed. If not, the method ends. If there is another image block to be processed, the method returns to block 1100.

Figure 12:
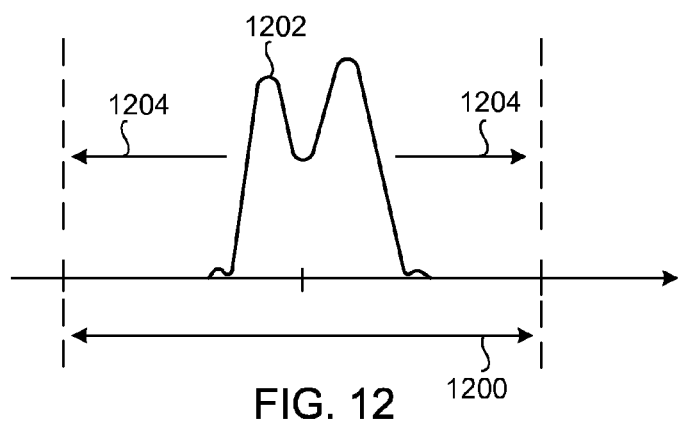
FIG. 12 is a conceptual drawing showing an effect of adjusting a gain of an amplifier in a processing channel.

Referring again to block 1104, if the histogram does not controllably fit into the ADC input range, the process passes to block 1108 where the histogram is analyzed and, based on the histogram and the ADC input range, one channel parameter is adjusted. For example, a gain of an amplifier can be adjusted to stretch or contract the histogram with respect to the ADC input range. FIG. 12 is a conceptual drawing showing an effect of adjusting a gain of an amplifier in a processing channel. The ADC input range is represented by the area 1200 and the histogram 1202 is illustrated within the ADC input range. A gain of an amplifier can be adjusted in the illustrated embodiment to stretch or extend the histogram 1202 within the ADC input range (stretch represented by arrows 1204). Other embodiments can adjust a gain of an amplifier to shrink or contract the histogram within an ADC input range.

Figure 13:
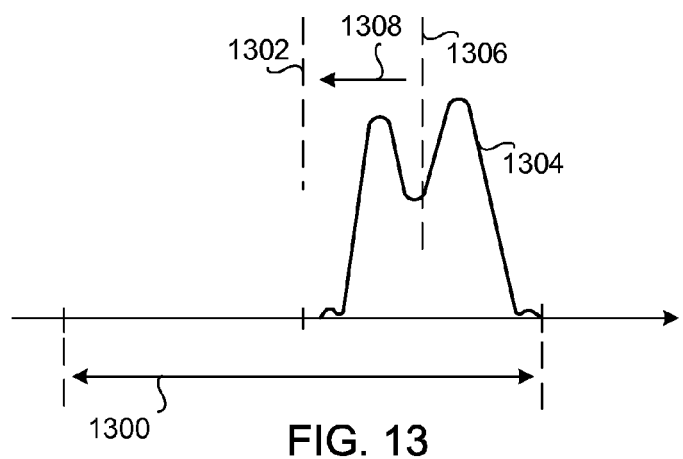
FIG. 13 is a conceptual drawing showing an effect of adjusting an offset signal in a processing channel.

Alternatively, an offset signal (another type of channel parameter) can be adjusted to shift or move (e.g., center) the histogram with respect to the ADC effective input range. FIG. 13 is a conceptual drawing showing an effect of adjusting an offset signal in a processing channel. The ADC input range is represented by the area 1300 with the center or median point of the ADC input range at point 1302. The center or median of the histogram 1304 is at point 1306. An offset signal produced by an offset circuit can be adjusted in the illustrated embodiment to shift the center 1306 of the histogram 1304 to or towards the center 1302 of the ADC input range 1300 (shifting represented by arrow 1308). An offset signal from an offset circuit can be adjusted to shift or move the histogram in the opposite direction in other embodiments.

And finally, a reference voltage of the ADC (another type of channel parameter) can be adjusted. A reference voltage can determine the maximum value that the ADC can digitize. For example, an 8-bit ADC can convert biometric signals ranging from 0 volts to the reference voltage. This input range is divided into 256 values, or steps. The size of the step is given by $V_{reference}/256$, where $V_{reference}$ is the reference voltage and 256 is $2^8$ (8 for the 8-bit ADC).

Additionally, other embodiments may not analyze the histogram prior to adjusting a channel parameter. Instead, the channel parameters may be adjusted in a pre-defined order. By way of example only, an offset signal may be adjusted first, followed by a gain of an amplifier, followed by another offset signal, and then followed by both the gain of another amplifier and the reference voltage of the ADC, until all of the channel parameters in the processing channel have been adjusted.

After the channel parameter is adjusted at block 1108, a determination is made at block 1110 as to whether or not a desired number of biometric signals in the histogram fall into a removed range or ranges. By way of example only, the number of biometric signals in the removed ranges can be less than, or equal to, a given number of N biometric signals, where N is an integer number. If the desired number of biometric signals is not included in the removed range(s), the method passes to block 1112 where another channel parameter is adjusted. The histogram can be analyzed as described above prior to adjusting the channel parameter. The process then returns to block 1102.

When the desired number of biometric signals is included in the removed range or ranges at block 1110, the method passes to block 1106 where a determination is made as to whether or not there is a another image block to be processed. If so, the process returns to block 1100 and the method repeats until all of the image blocks have been processed.

The optimum channel parameters for each image block can be determined at the completion of the FIG. 11 method. As described earlier, the optimum or determined channel parameters controllably fit each histogram into the ADC input range. The determined channel parameters for each image block can be stored in a storage device (e.g., storage device 724) and used to process subsequently captured image blocks. The method of FIG. 11 can be performed periodically or at select times to determine channel parameters, or to confirm already determined channel parameters continue to effectively fit the histogram into the ADC input range.

Each adjustable allowed input range of the histogram acts as a guard band that eliminates or reduces the number of saturated biometric signals in an image block. As described earlier, a saturated biometric signal is a signal that falls outside the ADC input range. The adjustable allowed input range or ranges permit a fingerprint image to be affected by noise while still allowing a satisfactory number of biometric signals to be processed to produce a fingerprint image.

Figure 14:
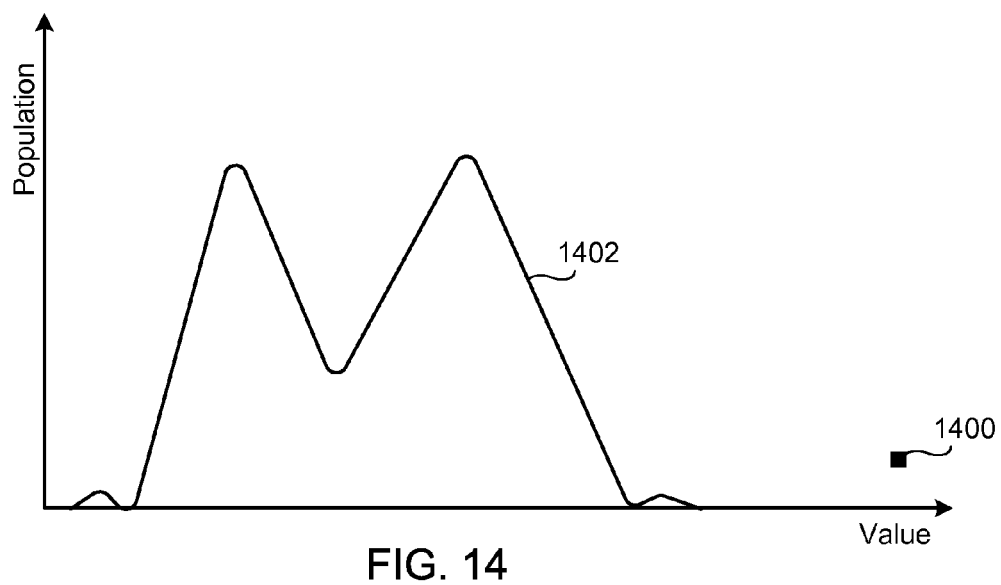
FIG. 14 depicts one example histogram for an image block with an outlier biometric signal.

Referring now to FIG. 14, there is shown one example histogram for an image block with an outlier biometric signal. In some embodiments, one or more biometric signals will be outlier biometric signals in that the biometric signal 1400 resides substantially outside of, or distant from the other biometric signals in the histogram 1402. An outlier biometric signal can be much greater than, or less than, the other biometric signals in the histogram. The value at which a biometric signal is an outlier can be pre-determined prior to processing an image block in a processing channel. Alternatively, the value at which a biometric signal is an outlier can be determined in real-time as an image block is processed in a processing channel.

An outlier biometric signal can be caused by several factors, including a bad sensing element in the capacitive fingerprint sensor. As discussed earlier, the method of FIG. 11 controllably fits a histogram of each image block into the ADC input range. An outlier biometric signal can skew the channel parameter settings for an image block when the histogram is processed because the method includes the outlier biometric signal in the fitting of the histogram into the ADC input range. The outlier biometric signal will unduly contract the histogram within the ADC input range since the outlier biometric signal is included in the controllable fit. The skewed determination can adversely affect the processing channel and a final fingerprint image. For example, the skewed determination can limit the dynamic range of the ADC.

Figure 15:
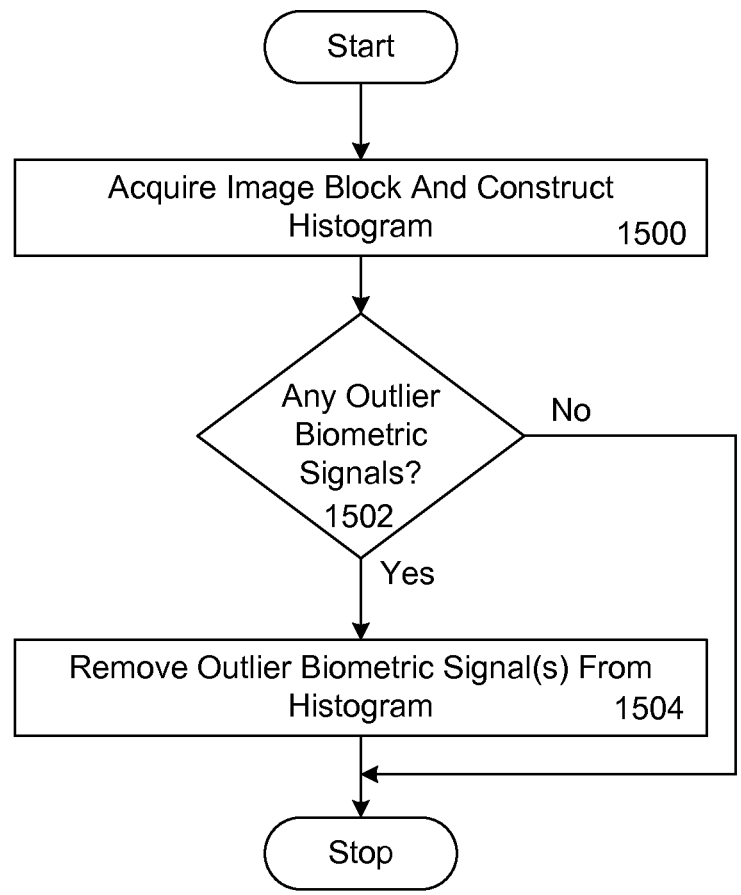
FIG. 15 is a flowchart of an example method for adjusting a histogram that has one or more outlier biometric signals.

FIG. 15 is a flowchart of an example method for adjusting a histogram that has one or more outlier biometric signals. Initially, an image block is acquired and the histogram constructed, as shown in block 1500. A determination is then made at block 1502 as to whether or not there are any outlier biometric signals in the histogram. If there are one or more outlier biometric signals, the process passes to block 1504 where the outlier biometric signal or signals is removed from the histogram. The method shown in FIG. 10 or FIG. 11 can be performed after block 1504, thereby eliminating the outlier biometric signals from the controllable fitting of the histogram into the ADC input range.

Embodiments described herein controllably fit the biometric signals into an ADC input range of an ADC. One or more channel parameters of a processing channel are adjusted to controllably fit a histogram (or the biometric signals) into the ADC input range. The channel parameters can include the gain of an amplifier, an offset signal produced by an offset circuit, and a reference voltage of the ADC. The determined channel parameters can be stored in a storage device and used to process subsequently captured biometric signals.

The ADC input range can include three regions; a safe input range, one or more adjustable allowed input ranges, and one or more removed ranges. If the number of biometric signals in each adjustable allowed input range produces a higher number of biometric signals in the removed range or ranges than desired, the number of biometric signals included in each adjustable allowed input range can be modified so that the proper number of biometric signals fall into each removed range. The adjustable allowed input range or ranges permit a biometric device to be affected by noise while still allowing a satisfactory number of biometric signals to be processed and included in an image or data structure.

Various embodiments have been described in detail with particular reference to certain features thereof, but it will be understood that variations and modifications can be effected within the spirit and scope of the disclosure. For example, different types of biometric devices can be used to acquire biometric data of a person, and/or a different physical characteristic or behavioral trait can be used in other embodiments. As another example, the captured biometric data does not need to be logically divided into non-overlapping image blocks or portions, and instead can be processed differently in other embodiments. In another example, biometric signals can be controllably fitted into an ADC input range without constructing a histogram.

And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for controllably fitting analog biometric signals into an input range of an analog-to-digital converter (ADC) operatively connected to a biometric device, the method comprising:
   receiving the analog biometric signals representing captured biometric data from the biometric device;
   determining a distribution of the analog biometric signals with respect to the input range of the ADC, wherein the input range is divided into at least one removed range and an effective input range that comprises a safe range and one or more adjustable allowed input ranges;
   based on the distribution, determining if a number of analog biometric signals in each removed range differs from a predetermined number of biometric signals to be included in each removed range; and
   adjusting, based at least in part on noise in the analog biometric signals, a number of analog biometric signals in at least one adjustable allowed input range when the number of analog biometric signals differs from the predetermined number.

2. The method as in claim 1, wherein adjusting the number of analog biometric signals in the at least one adjustable allowed input range comprises adjusting one or more channel parameters of a processing channel operatively connecting the biometric sensing device to the ADC, wherein the channel parameters include one or more of:

a gain of a variable gain amplifier;
an offset signal of an offset circuit; or
a reference voltage of the ADC.

3. The method as in claim 1, wherein receiving the analog biometric signals comprises receiving analog biometric signals representing a portion of the captured biometric data.

4. The method as in claim 1, further comprising:
dividing the input range of the ADC into the effective input range and the at least one removed range; and
determining the predetermined number of biometric signals to include in each removed range, each removed range including a subset of the analog biometric signals.

5. The method as in claim 1, further comprising:
determining if there are one or more outlier analog biometric signals prior to determining whether the number of analog biometric signals in each removed range differs from the predetermined number of biometric signals to be included in each removed range; and
not including the outlier analog biometric signals in the determination of whether the number of analog biometric signals in each removed range differs from the predetermined number of biometric signals to be included in each removed range.

6. A method for controllably fitting analog biometric signals into an input range of an analog-to-digital converter (ADC), the method comprising:
setting initial channel parameters of a processing channel operatively connected to a biometric device, wherein the channel parameters include one or more of:
a gain of an amplifier; or
an offset signal of an offset circuit;
receiving analog biometric signals representing captured biometric data;
determining a first distribution of the analog biometric signals with respect to the input range of the ADC, wherein the input range is divided into a safe range, one or more adjustable allowed input ranges, and one or more removed ranges;
determining whether a given number of biometric signals is included in the one or more removed ranges;
if the given number of biometric signals is not included in at least one removed range, adjusting, based at least in part on noise in the analog biometric signals, at least one channel parameter of the processing channel to adjust a number of analog biometric signals in at least one adjustable allowed input range;
receiving additional analog biometric signals representing captured biometric data;
determining a second distribution of the additional analog biometric signals with respect to the input range of the ADC;
determining whether the given number of biometric signals is included in the one or more removed ranges; and
storing the channel parameter in a storage device when the given number of biometric signals is included in the one or more removed ranges, wherein the channel parameter is used when the processing channel subsequently processes captured analog biometric signals.

7. The method as in claim 6, wherein the channel parameters further comprise a reference voltage of the ADC.

8. The method as in claim 6, further comprising repeatedly adjusting the same channel parameter or a different channel parameter until the given number of biometric signals is included in the one or more removed ranges.

9. The method as in claim 6, further comprising acquiring the analog biometric signals representing the captured biometric data.

10. The method as in claim 9, wherein receiving the analog biometric signals representing the captured biometric data comprises receiving analog biometric signals representing a portion of the captured biometric data.

11. The method as in claim 6, further comprising:
determining if an outlier analog biometric signal is included in the received analog biometric signals representing the captured biometric data prior to determining whether the given number of biometric signals is included in the one or more removed ranges; and
not including the outlier analog biometric signal in the determination of whether the given number of biometric signals is included in the one or more removed ranges.

12. An electronic device, comprising:
a processing channel operatively connected to a biometric device, wherein the processing channel includes an analog-to-digital converter (ADC) operatively connected to at least one of:
a variable gain amplifier; or
an offset circuit; and
a processor operatively connected to the processing channel and adapted to:
determine a distribution of analog biometric signals with respect to an input range of the ADC, wherein the input range of the ADC includes an effective input-range comprising biometric signals that are input into the ADC and one or more removed ranges each comprising at least one biometric signal that is outside the effective input range, the effective input range comprising a safe range and one or more adjustable allowed input ranges;
based on the determined distribution, determine if a number of analog biometric signals in each removed range differs from a predetermined number of biometric signals to be included in each removed range; and
adjust, based at least in part on noise in the analog biometric signals, one or more channel parameters of the processing channel to adjust a number of analog biometric signals in at least one adjustable allowed input range until the predetermined number of biometric signals is included in the one or more removed ranges, wherein the one or more channel parameters comprise at least one of:
a gain of the variable gain amplifier;
an offset signal produced by the offset circuit;
a reference voltage of the ADC.

13. The electronic device as in claim 12, further comprising a storage device, wherein the processor is adapted to store the one or more channel parameters in the storage device when the number of analog biometric signals in each removed range matches the predetermined number of biometric signals to be included in each removed range.

14. The electronic device as in claim 13, wherein the processor is further adapted to apply the stored one or more channel parameters to the processing channel when the processing channel subsequently processes captured analog biometric signals.

15. The electronic device as in claim 12, wherein the biometric device comprises a fingerprint sensing device.

16. The electronic device as in claim 15, wherein the biometric signals comprise a portion of a fingerprint image.

17. The method of claim 1, wherein:
the biometric device comprises a fingerprint sensing device; and
the biometric signals comprise a portion of a fingerprint image.

18. The method of claim 1, further comprising:
receiving additional analog biometric signals representing captured biometric data; and
processing the additional analog biometric signals based on the adjusted number of analog biometric signals in the at least one adjustable allowed input range.

19. The method of claim 6, wherein:
the biometric device comprises a fingerprint sensing device; and
the biometric signals comprise a portion of a fingerprint image.

20. The method of claim 6, wherein the channel parameters include one or more of:
a gain of a variable gain amplifier;
an offset signal of an offset circuit; or
a reference voltage of the ADC.

* * * * *